United States Patent [19]
Brown et al.

[11] 3,853,793
[45] Dec. 10, 1974

[54] PRODUCTION OF CARBON ELECTRODES

[75] Inventors: John Alexander Brown; Paul Rhedey, both of Arvida, Quebec, Canada

[73] Assignee: Alcan Research and Development Limited, Montreal, Quebec, Canada

[22] Filed: Jan. 7, 1972

[21] Appl. No.: 216,286

[52] U.S. Cl.............. 252/510, 252/502, 106/284, 106/273
[51] Int. Cl.................................. H01b 1/06, H01c
[58] Field of Search................ 252/510, 511, 502; 106/273, 284

[56] References Cited
UNITED STATES PATENTS

| | | | |
|---|---|---|---|
| 2,645,583 | 7/1953 | Stanko | 252/510 |
| 2,653,878 | 9/1953 | Sejersted et al. | 252/510 |
| 3,284,334 | 11/1966 | Metrailer et al. | 252/510 |

Primary Examiner—John D. Welsh
Attorney, Agent, or Firm—Cooper, Dunham, Clark, Griffin & Moran

[57] ABSTRACT

In carbon electrode compositions that contain an aggregate of calcined delayed petroleum coke bodies and fines, as used in aluminum reduction cell anodes, a portion of the calcined coke fines is replaced by partly calcined kiln dust produced incident to calcining of the coke. For such use, the kiln dust is first ground, preferably in mixture with fully calcined coke.

12 Claims, No Drawings

PRODUCTION OF CARBON ELECTRODES

BACKGROUND OF THE INVENTION

This invention relates to the production of carbon electrodes. More particularly, it relates to carbonaceous electrode materials and to methods of preparing them. In one specific sense, the invention is directed to the preparation of electrode compositions of the type comprising a mixture of calcined coke (e.g., delayed petroleum coke) bodies and fines with a pitch binder. These compositions are used in anodes of aluminum reduction cells; for purposes of illustration, the invention will be herein described with particular reference to such use.

A typical aluminum reduction cell comprises structure confining a body of a molten salt electrolyte such as cryolite containing dissolved alumina, and means including one or more carbon anodes suspended in the electrolyte for passing direct electric current therethrough to reduce the alumina electrolytically and thereby to produce alumina metal. In present-day commercial aluminum metal production, large number of these pots are connected in series to suitable direct current sources, for simultaneous operation.

One form of aluminum reduction cell utilizes as anode a plurality of relatively small, individually suspended, prebaked carbon electrodes. Since carbon of the anodes is gradually consumed during cell operation, these anodes must be replaced from time to time.

A widely used alternative form of cell electrode structure is the so-called Soderberg anode, which is a relatively large vertical column of carbonaceous material suspended above a cell with its lower end immersed in the electrolyte, and arranged to descend slowly toward the cell as the anode material is consumed therein. The upper portion of the anode column has a paste-like consistency, and is suitably jacketed to confine the paste; as the paste descends it is baked in situ by the heat of the cell operation, becoming fully hardened before it enters the electrolyte. Fresh quantities of carbon paste may be added from time to time to the upper end of the anode column, for continuous operation. Electrical connections are made to the anode by means of studs implanted in the carbon column.

The paste used in a Soderberg anode ordinarily comprises a mixture of so-called delayed petroleum coke bodies and particles with pitch as a binder. A substantial fraction of the coke used is in the form of very minute particules, referred to as fines, which may be, e.g., predominantly —100 mesh-size particles (as herein used, the term —100 mesh will be understood to refer to particles small enough to pass through a 100 mesh Tyler screen); the remainder of the coke is an aggregate of larger particles and bodies, herein collectively termed "bodies" to distinguish them in size from the smaller fines.

The compositions used to form prebaked anodes are similar to Soderberg paste compositions but have a significantly lower proportion of pitch binder. A high pitch content is used in Soderberg pastes to afford desired fluidity so that the paste flows properly when added to the top of the Soderberg anode column.

In accordance with conventional procedure, petroleum coke is calcined before use in electrode pastes, to drive off the volatile matter contained in green coke. This calcining operation is typically performed by feeding the green coke to a rotary kiln wherein the coke is heated as it advances along the length of the kiln.

An illustrative type of kiln used for this purpose is an elongated cylinder having an axis sloping somewhat downwardly from the inlet end to the outlet end, mounted for rotation about that axis and having a burner positioned at the outlet end to supply the requisite heat to the interior of the kiln. As calcination proceeds, with continuing feed of green coke, and discharge of calcined coke from the outlet end of the kiln, heated gas including the removed volatiles advances upwardly through the rotating kiln and is discharged adjacent the inlet end thereof. Sometimes the discharged gas is passed through a heat exchanger or like device for recovering heat from the gas for industrial use.

It is found that the gas discharged from a kiln incident to the calcination of petroleum coke includes substantial quantities of dust constituted of fine coke particles. These particles are believed to be produced by wear and breakage of larger coke bodies in the kiln feed incident to handling and tumbling of the feed inside the kiln; the rapid heating of the coke in the kiln may also contribute to particle formation. In any event, the amount of coke discharged from the kiln as fines or dust entrained in the kiln exhaust gases is as much as 5 – 10% by weight of the total amount of coke fed to the kiln. The particles comprising the kiln dust are partly though not fully calcined, having been exposed to temperatures of e.g. 600° – 800°C during their dwell in the kiln, and thus have a substantially lower content of volatiles than green coke, although they still have a higher volatile content than regular calcined coke.

Commonly the kiln flue gasses containing the partly calcined coke dust are passed through a dust collector or other separator which removes the kiln dust from the gas. Consequently, substantial quantities of this kiln dust accumulate incident to large-scale calcination of petroleum coke. Owing to the fact that it is not completely calcined, the coke dust thus collected has been regarded as a product of limited utility or even as waste. Since, as stated, the kiln dust represents a substantial fraction of the coke feed, it would be advantageous to utilize it, and in particular its use in electrode compositions would afford substantial economies in material costs.

Since the partly calcined coke of the kiln dust has a particle size range acceptable for use in the fines fraction of an electrode paste, attempts have been made to utilize this partly calcined kiln dust by substituting it in an electrode composition for some part of the usual fines fraction, which is produced by grinding fully calcined coke to the desired fine size in a suitable ball mill or the like.

Such use of partly calcined coke kiln dust to constitute part of the fines fraction of a Soderberg electrode paste has, however, been associated with various difficulties. In particular, it has been found that the thermal stability of the paste containing the kiln dust (in an amount equal to 5 – 10% by weight of the total coke content of the paste) is significantly lower than that of a conventional paste with a fully calcined fines fraction. The thermal stability, which is important for maintenance of a satisfactory commercial scale anode, is the resistance of the Soderberg anode paste to loss of paste flowability after exposure to elevated temperature (in the range encountered in use, i.e., above an aluminum reduction cell) for 24 – 48 hours. Paste containing 5% or more by weight partly calcined dust (based on the total coke content) has been found to become nearly dried out after 24 hours, under conditions in which a conventional paste remains quite fluid. Increased consumption of the anode material during operation of an aluminum reduction cell is also associated with use of the partly calcined dust in the anode paste. At least in some instances, there appear to have been other undesirable side effects, such as increase in anode resistance resulting from substitution of partly calcined dust for some of the fines in a Soderberg paste. Accordingly, the potential economic advantage of utilizing the partially calcined dust in electrode compositions has been largely or entirely negated by the disadvantages, including decreased thermal stability and increased consumption of anode material, associated with such use.

SUMMARY OF THE INVENTION

In a broad sense the present invention embraces the discovery that the partly calcined coke fines entrained as dust in kiln exhaust gases (incident to calcination of petroleum coke or other similar coke) may be rendered entirely suitable for use in the coke fines fraction of a carbonaceous electrode composition such as a Soderberg paste, if the collected kiln dust particles are first subjected to grinding. In other words, by grinding the partly calcined kiln dust particles of coke so as to break up the particles, they can be substituted for part of the fully calcined fines in a Soderberg paste or other electrode composition without significantly impairing the thermal stability, rate of anode consumption, or other properties of the composition. The proportion of the total coke content (of an electrode composition) that is constituted of the partly calcined kiln dust may correspond to the proportion of coke feed to the kiln that is ultimately recovered as dust, e.g., 5 – 10% by weight, thereby affording substantial savings in material cost. The only added cost associated with use of the kiln dust, i.e., as treated in accordance with the present invention, is a slight increase in the amount of pitch required as binder in the electrode composition. However, this small increase does not materially offset the economic advantage achieved by rendering the kiln dust suitable for use in electrode compositions.

In a particular sense, the invention embraces the discovery that the partly calcined coke fines of the kiln dust are highly porous (as compared to the fully calcined coke fines produced by grinding coke after calcination) owing, as presently believed, to the rapid though incomplete release of volatile matter from the partly calcined dust in the kiln. Grinding the dust, though not necessary to achieve the requisite particle size characteristics (since the dust is, as stated, already of an acceptable size for use in the fines fraction of an electrode paste) serves to break up the porous particles of dust, or in other words to significantly decrease their porosity through breakage and reduction in size. It is further believed that the disadvantages heretofore observed in use of partly calcined kiln dust in electrode pastes are attributable to the porous structure (with voids open to the outside of the particles) characteristic of the kiln dust. Specifically, it is believed that these particles having pores open to the outside tend to absorb binder material when a paste containing them is held at elevated temperatures such as at the upper end of a Soderberg anode above an operating aluminum reduction cell, and that the absorption of binder impairs the thermal stability of the paste.

Thus in one aspect the invention contemplates procedure for treating partly calcined coke fines by grinding the partly calcined fines to break up the particles thereof. Further, The invention contemplates procedure for making an electrode composition comprising an aggregate of calcined petroleum coke (or other similar coke) bodies, coke fines, and pitch as a binder, wherein partly calcined coke fines are ground to break up the particles thereof and incorporated with the other ingredients of the composition as part of the fines fraction.

As a further specific feature of the invention, the step of grinding the fines is performed with special advantage by first mixing the fines with a quantity of fully calcined coke and then grinding the partly calcined fines and fully calcined coke together. The fully calcined coke should have an average particle size larger than the partly calcined fines and may be present in such proportion as to constitute the major component of the mixture of fully calcined coke and partly calcined fines subjected to grinding. The presence of the calcined coke in the grinding step affords improved grinding efficiency, and inhibits the loss of fines that would occur incident to grinding these very fine particles without coarser material being present. Moreover, it is believed that as the fully calcined coarse material is ground, the surface-accessible pores of the partly calcined dust particles become filled with the fully calcined particles, thus further reducing the porosity of the partly calcined material. The ground mixture of partly and wholly calcined coke may then be added as the fines fraction to the other ingredients of the electrode composition, i.e., the coarser fraction of coke bodies and the pitch binder.

Further features and advantages of the invention will be apparent from the detailed description hereinbelow set forth.

DETAILED DESCRIPTION

The present invention may be described as embodied in the treatment of dust recovered from the flue gases discharged from a rotary kiln, e.g., of conventional character incident to the performance of a conventional calcination of delayed petroleum coke in the kiln. The structure and operation of the kiln, as well as the nature of the conventional calcining process, are familiar to those skilled in the art and accordingly need not be further described.

While specific reference is made herein to delayed petroleum coke, by way of illustration, the invention is broadly applicable to the treatment of any coke having a volatile content between about 10% and about 16% by weight. One additional example of such a coke is so-called delayed pitch coke, which is made from coal tar pitch. This coke, like delayed petroleum coke, is calcined prior to use in anodes for aluminum reduction cells, and partially calcined coke dust is recovered from the flue gases discharged from a kiln incident to such calcination.

Referring again specifically to treatment of delayed petroleum coke, as green coke is fed to the inlet end of a rotary kiln and calcined coke is discharged from the outlet end, as much as 5 – 10% by weight of the coke feed to the kiln leaves the kiln in the form of a fine dust entrained in the gases discharged from the kiln. This dust, which may result from abrasion of coarser coke particles of the feed as they tumble in the kiln and/or from the rapid heating of the coke feed, is in a partly calcined condition, having reached temperatures of, e.g., 600° – 800°C in the kiln before being borne away with the exhaust gases. It is constituted of more or less irregularly shaped, puffed and highly porous particles (i.e., with internal voids opening through surface pores) and typically has the following approximate composition and properties:

| | |
|---|---|
| Volatile matter | 1.0 – 2.5% by weight |
| Hydrogen | 0.4 – 1.0% by weight |
| Real density | 1.75 – 1.85 g/cm$^3$ |
| Bulk density | 0.55 – 0.70 g/cm$^3$ |
| Porosity | 35 – 55 % by volume |
| Particle size (Tyler mesh): | |
| through 100 mesh | 60 – 80% by weight |
| do. 200 do. | 20 – 40% do. |
| do. 325 do. | 5 – 25% do. |

It will be understood that the terms kiln dust, partly calcined dust or fines and partly calcined kiln dust or coke fines are used interchangeably herein to refer to material exemplified by the foregoing description.

The nature and properties of the partly calcined fines may be further understood by comparison of a typical illustrative example of the partly calcined fines with a sample of fully calcined coke fines produced in conventional manner by calcining delayed petroleum coke and grinding the coarse calcined particles:

| Fines | Partly Calcined | Fully Calcined Fines |
|---|---|---|
| Volatile matter (wt. %) | 1.5 | 0.1 |
| Hydrogen (wt. %) | 0.7 | 0.1 |
| Real density (g/cm$^3$) | 1.80 | 2.05 |
| Bulk density (g/cm$^3$) | 0.65 | 0.85 |
| Porosity (vol. %) | 40.0 | 25.0 |

It will be understood further that in accordance with common present-day commercial practice, the exhaust or flue gases discharged from a rotary kiln in which petroleum coke is being calcined are passed through a suitable and, e.g., conventional separator such as a dust collector for extracting from the gas the kiln dust entrained therein. Thus the exhaust gas is cleansed of particulate material, and the kiln dust is collected.

In accordance with the method of the present invention, in an illustrative embodiment thereof, the kiln dust thus collected is subjected to grinding, for example in a conventional ball mill or other conventional grinding apparatus which breaks up the particles. The purpose of this grinding is to destroy the high porosity structure of the dust particles, as described above, this structure having been formed (as presently believed) by sudden or flash release of volatile matter from the particles when heated in the kiln. The grinding, therefore, need only be sufficient to effect the desired destruction of the porous structure, since the kiln dust is already in or close to a particle size range satisfactory for use in the fines fraction of an electrode paste.

Further in accordance with the invention, to facilitate handling and grinding of the dust, it is preferably mixed with a quantity of fully calcined petroleum coke bodies or particles which are coarser than the partly calcined fines or dust. The amount of fully calcined coke mixed with the kiln dust may be substantially greater than the amount of kiln dust being ground. This mixture of partly calcined fines and relatively coarser fully calcined coke bodies is then ground in the ball mill or other conventional grinding apparatus. The ground product, including both ground fully calcined coke and partly calcined particles which have been broken up to destroy their porous structure, is then ready for incorporation with other ingredients of an electrode paste and may constitute all or part of the fines fraction of such paste.

Stated with reference to the above-described example of kiln dust initially having a particle size distribution characterized by a –200 mesh content of about 20 to about 40% by weight, it is found that the structure of the porous dust particles is sufficiently destroyed (i.e., for use of the dust as fines in an electrode paste) when the –200 mesh content of the fines has been increased by the grinding operation to a range of about 60 to about 80% by weight, such range representing preferred values in accordance with this invention.

The ground partly calcined fines (e.g., in mixture with fully calcined coke that has been ground into fine particle size along with the partly calcined fines by the procedure just described) may be mixed with conventional ingredients of a Soderberg electrode paste to constitute all or part of the fines fraction of such paste. Typically, the paste comprises a fraction of relatively coarse calcined petroleum coke bodies or particles, together with a fraction of coke fines and pitch as a binder. In illustrative instances, the pitch content of the paste may be about 28% to about 35% by weight. The partly calcined and ground kiln dust may for example constitute about 5% to about 10% by weight of the total coke (coarse and fine) content of the paste, the balance of the coke content being constituted of fully calcined petroleum coke bodies, particles and fines. As will be understood, in such composition, the partly calcined ground kiln dust is substituted for part of the fines fraction of the coke content of a conventional electrode paste composition, i.e., in place of part of the fully calcined fines ordinarily incorporated in such conventional composition.

It is found that the grinding of the partly calcined kiln dust in accordance with the present invention renders the dust fully satisfactory for incorporation in an electrode paste, in proportions commensurate with the proportions of kiln coke feed that leave the kiln as such dust, e.g., up to 10% by weight of total coke content. That is to say, pastes incorporating the ground kiln dust of the invention as part of the fines fraction exhibit no significant impairment of thermal stability, binder consumption, or anode consumption rate as compared with electrodes made of conventional pastes, and are fully satisfactory in operation. Use of the ground kiln dust is sometimes found to require a slight increase in amount of pitch used as a binder, but there is nevertheless a substantial overall saving in material cost owing to the useful consumption of the heretofore discarded kiln dust. As stated, it is believed that the advantages of the invention, in rendering the kiln dust suitable for use in electrode compositions, are attributable to the destruction of the porous structure of the dust by grinding, and that the disadvantages heretofore associated with the use of such dust have resulted chiefly or primarily from absorption of the binder through the pores of the dust particles into the interior voids of the particles.

Use of such kiln dust, (i.e., if not ground in accordance with the present invention) would also give prebaked anodes an undesirably low density. Accordingly, in a broad sense the invention is applicable to the preparation of electrode compositions for prebaked anodes as well as Soderberg pastes, i.e., grinding of kiln dust fines in accordance with the invention renders the fines suitable for incorporation in the fines fraction of a prebaked anode paste, because the break-up of porosity effected by such grinding increases the density of the fines.

The invention also embraces carbon electrode paste compositions of the general type comprising an aggregate of coke bodies and particles, coke fines, and a carbonaceous binder material such as coal tar pitch, wherein a portion of the fines fraction is constituted of ground partly calcined coke fines. In other respects, the composition may be essentially conventional in character, i.e., as used in present-day practice for Soderberg or prebaked anodes. Thus the relative proportions of binder, fines fraction, and coarser coke fractions may be conventional, as also the particle size characteristics of the various coke fractions in the aggregate. The term "aggregate" is used herein to refer to all the coke fractions of the paste, including the fines, but not including the binder. Further in accordance with conventional practice, in the compositions of the invention the coke constituting the aggregate may be delayed petroleum coke, and (except for the ground partly calcined fines) all the coke in such aggregate is fully calcined. Also, the preparation and mixture of the various ingredients of the paste may be conventional, again with the exception of the treatment of the partly calcined fines.

Thus an exemplary embodiment of Soderberg anode paste compositions in accordance with the invention may comprise an aggregate of petroleum coke consisting essentially of a fines fraction and at least one coarser fraction of fully calcined petroleum coke bodies or particles, and a coal tar pitch binder conventionally mixed and in conventional relative proportions, wherein a portion of the fines fraction of the aggregate (e.g., such portion amounting to between about 5% and about 10% by weight of the total aggregate) is constituted of ground partly calcined coke fines, the remainder of the fines fraction being conventionally produced, ground, fully calcined coke particles of the usual size range for such fines. The ground partly calcined coke fines incorporated in this exemplary composition may have the properties and characteristics exemplified by the ranges of values set forth above for kiln dust and may be obtained by collecting such kiln dust and subjecting it to grinding sufficient to substantially decrease the porosity of the individual dust particles, all as described above with reference to the method of the invention.

Stated generally, in the paste compositions of the invention prepared for use in Soderberg anodes, it is preferred that the aggregate consist essentially of about 50% to about 60% by weight coarse (−½ inch, +48 mesh) calcined coke particles (indeed very preferably about 55% by weight coarse particles), and about 40% to about 50% by weight coke fines (−48 mesh particles); that the ground partly calcined kiln dust, incorporated in the fines fraction, constitute about 5% to about 10% by weight of the total aggregate; and that the amount of coal tar pitch mixed with this aggregate as a binder constitute between about 28% and about 35% (preferably 29 to 31%) by weight of the paste mixture). Binder content is determined by fluidity desired; for example, a Soderberg anode of the vertical stud type generally requires a paste of greater fluidity, and hence a higher proportion of binder, than a Soderberg anode of the horizontal stud type.

In the above-described step of grinding the kiln dust with fully calcined coke, the ratio of coarse calcined coke to partly calcined kiln dust is preferably between about 60:40 and about 95:5, a range of values between 70:30 and 85:15 being especially preferred for such ratio. Typical coarse fully calcined coke bodies or particles in the mixture for grinding (i.e., before the grinding step) may be of −4 mesh, +48 mesh size. The grinding step should be performed until at least about 40% by weight, and preferably about 60 to 80% by weight, of the partly calcined kiln dust particles are of −200 mesh size. In other words, −200 mesh particles may constitute about 40 to 100% by weight (preferably about 60 to about 80% by weight) of the ground kiln dust incorporated with the other ingredients in the paste compositions of the invention.

EXAMPLE I

In the following table there are set forth, for purposes of comparison and illustration, three Soderberg anode paste compositions, whereof composition A is a conventional paste having an aggregate consisting of 100% calcined coke, while compositions B and C have aggregates respectively containing 5 and 10% (by weight of the aggregate) ground kiln dust fines in accordance with the present invention. In each of these compositions, pitch binder constitutes 30% by weight of the paste, and the aggregate of coarse and fine coke particles constitutes the remaining 69% by weight of the paste. Relative proportions of various particle size fractions (expressed as percent by weight of the total paste composition, i.e., including binder) are as follows:

Composition (% by weight of total paste)

| Mesh Size | A | B* I | B* II | C* I | C* II |
|---|---|---|---|---|---|
| +3 | 3.5 | 3.5 | — | 3.5 | — |
| −3 +4 | 2.8 | 2.8 | — | 2.8 | — |
| −4 +10 | 11.5 | 11.5 | — | 11.5 | — |
| −10 +20 | 5.9 | 6.3 | — | 6.3 | — |
| −20 +48 | 8.6 | 9.0 | — | 9.0 | — |
| −48 +100 | 7.6 | 6.9 | 0.6 | 6.1 | 1.1 |
| −100 +200 | 7.6 | 6.9 | 1.0 | 6.1 | 1.9 |
| −200 | 21.5 | 18.6 | 1.9 | 16.8 | 3.9 |
| total coarse (+48 mesh) | 32.3 | 33.1 | — | 33.1 | — |
| total fines (−48 mesh) | 36.7 | 32.4 | 3.5 | 29.0 | 6.9 |

*Columns I and II respectively designate percentages (by weight of the paste) of fully calcined coke, and ground partly calcined kiln dust.

EXAMPLE II

In further illustration, there are set forth below three aggregate compositions suitable for use in prebaked anode paste compositions, all relative proportions being expressed in this table as percent by weight of the aggregate:

Composition (% by weight of aggregate)

| Mesh Size | D | E* I | E* II | F* I | F* II |
|---|---|---|---|---|---|
| +48 | 55 | 55 | — | 55 | — |
| −48 +100 | 10 | 9.2 | 0.8 | 8.4 | 1.6 |
| −100 +200 | 12 | 10.6 | 1.4 | 9.2 | 2.8 |
| −200 | 23 | 20.2 | 2.8 | 17.4 | 5.6 |
| total fines (−48 mesh) | 45 | 40.0 | 5.0 | 35.0 | 10.0 |

*Columns I and II respectively designate percentages (by weight of the aggregate) of fully calcined coke and ground partly calcined kiln dust.

In the table just given, the coarse (+48) fraction of each composition is divided as follows:

| | |
|---|---|
| +3 mesh | 8 wt.% of total aggregate |
| −3 +4 | 6 |
| −4 +10 | 23 |
| −10 +20 | 12 |
| −20 +48 | 6 |

Composition D is conventional, consisting of fully calcined coke, while compositions E and F are prepared in accordance with the present invention.

With each of these aggregates, there may be mixed a binder in amount sufficient to provide a paste for use in making prebaked anodes, wherein about 14 to 17% by weight (of the total paste) is binder. To produce a prebaked anode from such paste, the paste is formed into a hard mass as by application of high pressure or vibration; the mass or block is then baked to 1,100°C and cooled, and a steel rod is inserted into the block to act as an electrical connection.

EXAMPLE III

The characteristics and properties of an exemplary Soderberg anode paste prepared in the laboratory in accordance with the invention and incorporating in the fines fraction an amount of ground partly calcined coke fines (as defined above) constituting 8% by weight of the total coke aggregate are compared with similarly measured properties and characteristics of a conventional paste having an aggregate (including fines fraction) consisting entirely of fully calcined coke in the following table:

| | Test Paste | Control |
|---|---|---|
| Binder (% by weight) | 29 | 29 |
| Paste elongation (%) | 75 | 40 |
| Apparent density (g/cm³) | | |
| Green | 1.64 | 1.62 |
| Baked | 1.49 | 1.48 |
| Compressive strength (Kg/cm²) | 350 | 316 |
| Resistivity (10⁻⁴ ohm. cm) | 69 | 66 |
| Air permeability (cm²/sec) | 36 | 14 |
| Air oxidation rate (g/cm².hr) | 0.126 | 0.140 |
| Anode consumption (%) | 126.0 | 127.8 |
| Paste consumption (lb/kAh) | 0.3478 | 0.3528 |

The foregoing values indicate that the paste containing ground partly calcined fines is fully satisfactory for use in a Soderberg anode.

The value of elongation for each paste in the above table is the percentage increase in length of a hand-pressed paste sample (25 mm. in diameter and 50 mm. long) placed on a sloping board in an oven preheated to 255°C, and retained in the oven for 15 minutes; i.e., elongation is the increase in length of the sample after heating for 15 minutes, expressed as a percentage of the sample length before heating.

EXAMPLE IV

A further example of a test paste (containing 5.5% by weight ground kiln dust in the aggregate) in accordance with the invention, compared with a conventional (control) paste containing no kiln dust, as determined in a plant-scale test, is set forth below:

| Test Paste | | Control | Difference |
|---|---|---|---|
| Binder (% by weight) | 27.28 | 27.12 | +0.16 |
| Paste elongation (%) | 74.75 | 72.05 | +2.70 |
| Paste Consumption (lb/kAh) | 0.3592 | 0.3584 | +0.22% |

The foregoing data show that there is at most a slight increase in binder requirement and a slight (about 0.2%) increase in rate of paste consumption when ground kiln dust is incorporated in the fines fraction of a Soderberg anode paste, as compared with the binder requirements and paste consumption rate in a conventional paste containing no kiln dust. By way of comparison, laboratory tests have shown that when 5% partly calcined kiln dust is incorporated in a Soderberg anode paste without grinding, the overall increase in anode consumption is about 2.2%, including consumption due to air oxidation, and in a plant-scale test, again using 5% by weight (of total coke aggregate) partly calcined kiln dust without grinding, an overall increase of 2.4% of anode consumption rate was observed. The grinding of the kiln dust, therefore, is shown to decrease both the paste consumption rate and the air oxidation rate very significantly, and indeed to such an extent as to enable the economically advantageous use of the ground kiln dust in electrode pastes.

EXAMPLE V

Two samples of partly calcined coke fines collected from kiln flue gas incident to the calcination of delayed petroleum coke, and having a composition, properties and size characteristics within the exemplary ranges set forth above as typical of such kiln dust, were mixed with fully calcined coke particles of −48 Tyler mesh size and ground in a laboratory jar mill for twenty minutes to produce a partly and fully calcined coke fines mixture whereof 85% comprised particles of −100 Tyler mesh size. The ratio of fully calcined coke to partly calcined coke was 9:1 in the case of one sample, and 7.8:2.2 in the case of the other sample.

The fines mixtures produced by these grinding operations were used as the fines fraction in three-fraction aggregates of delayed petroleum coke, wherein all coke was fully calcined except for the ground, partly calcined kiln dust in the fines. The ground kiln dust comprised 4.5% by weight in which one such coke aggregate, and 10% by weight in another.

Two further coke aggregates were prepared, similar to those just described except that in one of these aggregates no kiln dust was used (the fines fraction consisting of −48 mesh fully calcined coke particles ground until 85% of the fraction was of −100 mesh size), and the other of these aggregates contained 10% by weight unground kiln dust.

Each of the aggregates was mixed (at a temperature of 155°C) with a coal-tar pitch binder having a 96°C softening point (cube in air) to produce pastes containing, in each case, 31% by weight binder. The four pastes were each tested for elongation, and then put in a can and maintained at a temperature of 225°C. For each paste, further elongation measurements were made after the paste had been held for 24 and 48 hours at 225°C. Results are as follows:

Elongation (%)

| Kiln Dust in Paste Aggregate (% by weight) | Initial | After 24 hrs. at 225°C | After 48 hrs. at 225°C | Ratio Initial to 48 hrs. |
|---|---|---|---|---|
| None | 65 | 33 | 26 | 2.5 |
| 4.5% (ground) | 76 | 24 | 20 | 3.8 |
| 10% (ground) | 83 | 31 | 18 | 4.6 |
| 10% (unground) | 64 | 4 | hard mass | — |

These results indicate that the pastes containing up to 10% by weight kiln dust ground in accordance with the invention possessed satisfactory thermal stability, as represented by measured values of elongation after 24 and 48 hours at 225°C, but that the paste containing unground kiln dust was not thermally stable.

It is to be understood that the invention is not limited to the features and embodiments hereinabove specifically set forth but may be carried out in other ways without departure from its spirit.

We claim:

1. Procedure for preparing a carbon electrode paste which comprises an aggregate of coke fines and larger coke bodies in mixture with a pitch binder, said procedure comprising
   a. grinding coke dust entrained in and collected from gases discharged from a kiln incident to calcination of coke in the kiln, for breaking up the particles thereof; and
   b. mixing the ground coke dust with fully calcined coke fines and larger bodies with said binder to form a paste wherein said ground dust constitutes a portion of the fines fraction of the aggregate, said fully calcined coke comprising coke material calcined in a kiln and removed therefrom, after calcining, separately from gases discharged from the kiln.

2. Procedure according to claim 1, wherein said grinding step comprises grinding the collected coke dust to reduce the particle size thereof sufficiently so that at least about 60% of said dust is −200 Tyler mesh size.

3. Procedure according to claim 1, wherein said dust from a kiln constitutes at least about 5% by weight of the aggregate.

4. Procedure according to claim 1, wherein said dust contains about 1.0 to about 2.5 % by weight volatile matter and about 0.4 to about 1.0% by weight hydrogen, having a real density of about 1.75 to about 1.85 grams per cubic centimeter, a bulk density of about 0.55 to about 0.70 grams per cubic centimeter, and a porosity of about 35 to about 55% by volume, said dust comprising particles of which about 60 to about 80% are −100 Tyler mesh, about 20 to about 40% are −200 Tyler mesh, and about 5 to about 25% are −325 Tyler mesh, said dust being entrained in gas discharged from a kiln wherein petroleum coke is calcined and being collected from said gas, said grinding step comprising grinding said dust for reducing the porosity thereof by breaking up the particles of the fines.

5. Procedure according to claim 4, wherein said grinding is performed to reduce the particle size of said dust sufficiently so that at least about 40% of the particles of said dust are −200 Tyler mesh size.

6. Procedure according to claim 4, wherein said grinding step comprises grinding the dust in mixture with a quantity of said fully calcined coke.

7. Procedure as defined in claim 6, wherein said quantity of said fully calcined coke comprises coke particles having an average particle size substantially larger than the average particle size of said dust before grinding, said quantity of said fully calcined coke being greater than the quantity of dust mixed therewith; and wherein the grinding of the mixture of said dust and said fully calcined coke is performed to reduce the particle size of the mixture sufficiently so that about 60 to about 80% of the particles of said dust are −200 Tyler mesh size.

8. A paste comprising
   a. a coke aggregate consisting essentially of
      i. a first fraction of coke fines and
      ii. at least one fraction of calcined coke bodies larger than said fines; and
   b. a binder comprising pitch;
   c. ground partly calcined coke fines constituting a portion of said fines fraction of said aggregate, said ground partly calcined fines containing about 1.0 to about 2.5% by weight volatile matter and about 0.4 to about 1.0% by weight hydrogen, having a real density of about 1.75 to about 1.85 grams per cubic centimeter, a bulk density of about 0.55 to about 0.70 grams per cubic centimeter, and a porosity of about 35 to about 55% by volume, and consisting of particles of which at least about 40% are −200 Tyler mesh size, the remainder of the fines fraction of the aggregate consisting essentially of fully calcined coke fines having a content of volatile matter substantially lower than that of said partly calcined fines.

9. A paste as defined in claim 8, wherein the ground partly calcined fines constitute at least about 5% by weight of said aggregate.

10. Procedure for preparing a carbon electrode paste which comprises an aggregate of coke fines and larger coke bodies in mixture with a pitch binder, said procedure comprising:
   a. grinding coke dust entrained in and collected from gases discharged from a kiln incident to calcination of coke in the kiln, in mixture with a quantity of fully calcined coke particles, for breaking up the particles of the dust and thereby producing a ground mixture of the dust and fully calcined particles; and
   b. mixing said ground mixture with a further quantity of fully calcined coke including coke bodies larger than the fully calcined particles in said mixture, and with said binder, to form a paste wherein the ground mixture of fully calcined particles and said dust from a kiln constitutes at least a portion of the fines fraction of said aggregate, said fully calcined coke comprising coke material calcined in a kiln and removed therefrom, after calcining, separately from gases discharged from the kiln.

11. Procedure according to claim 10, wherein said step of grinding said dust comprises the dust in mixture with particles of said fully calcined coke having a larger average particle size than said dust.

12. Procedure according to claim 10, wherein said first-mentioned quantity of fully calcined coke particles is greater than the quantity of said dust with which it is mixed and ground.

* * * * *

UNITED STATES PATENT AND TRADEMARK OFFICE
CERTIFICATE OF CORRECTION

PATENT NO. : 3,853,793
DATED : December 10, 1974
INVENTOR(S) : John Alexander Brown and Paul Rhedey It is certified that error appears in the above-identified patent and that said Letters Patent are hereby corrected as shown below:

Col. 1, line 22, "number" should read --numbers-- .

Col. 5, approximately line 35 (in the table), "Fines" should be deleted from the top of the first column; in the same table, the heading "Partly Calcined" should read --Partly Calcined Fines-- .

Col. 8, line 35, "30%" should read --31%-- ;

line 58 (in the table), "6.9" should be moved to the right, and thus appear under heading C II.

Col. 10, approximately line 12 (in the table), "Test Paste" should be deleted from the top of the first column, and placed instead over the column beginning "27.28."

Col. 11, approximately line 9, (in the table), the black line under "Elongation (%)" should embrace only the middle three columns (i.e. should not appear over the headings beginning "Kiln Dust" and "Ratio Initial";

line 38, after "bodies" insert --and-- .

Col. 13, line 8, after "comprises" insert --grinding-- .

Signed and Sealed this

Seventeenth Day of August 1976

[SEAL]

Attest:

RUTH C. MASON
Attesting Officer

C. MARSHALL DANN
Commissioner of Patents and Trademarks